United States Patent [19]

Jansson

[11] Patent Number: 5,680,333
[45] Date of Patent: Oct. 21, 1997

[54] PREDICTIVE SIMULATION OF HEATHER FABRIC APPEARANCE

[75] Inventor: Peter Allan Jansson, Hockessin, Del.

[73] Assignee: E. I. du pont de Nemours and Company, Wilmington, Del.

[21] Appl. No.: 535,694

[22] Filed: Sep. 28, 1995

[51] Int. Cl.⁶ .................... G06F 17/10; G05B 17/00
[52] U.S. Cl. ................ 364/578; 395/131; 382/111
[58] Field of Search ................ 364/578, 470.01, 364/470.02, 470.03, 470.13, 470.12; 395/129, 130, 131; 382/111; 264/103

[56] References Cited

U.S. PATENT DOCUMENTS

| | | | |
|---|---|---|---|
| 4,164,117 | 8/1979 | Talbot | 57/289 |
| 4,228,640 | 10/1980 | Talbot | 57/208 |
| 4,274,182 | 6/1981 | Greenway | 26/2 R |
| 4,327,464 | 5/1982 | Hutcheson | 28/218 |
| 4,329,143 | 5/1982 | Hutcheson | 8/483 |
| 4,338,090 | 7/1982 | Hutcheson | 8/478 |
| 4,469,037 | 9/1984 | Bost, Jr. | 112/266.2 |
| 4,546,026 | 10/1985 | Kowalski | 428/91 |
| 4,954,976 | 9/1990 | Noonan | 364/578 |
| 4,984,181 | 1/1991 | Kliman et al. | 364/518 |
| 5,493,518 | 2/1996 | Keating | 364/578 |
| 5,551,011 | 8/1996 | Danby et al. | 395/500 |
| 5,564,169 | 10/1996 | Willauer | 26/70 |

*Primary Examiner*—Kevin J. Teska
*Assistant Examiner*—Tyrone V. Walker

[57] ABSTRACT

A computer-aided method and an apparatus generates and displays, on a display device, an accurate predictive simulation of the appearance of a color pattern of a hypothetical heather yarn fabric, such as a tufted carpet, comprised of multiple candidate heather yarn components. Starting from a set of user-selected initial conditions a model is generated representing the appearance of a hypothetical heather yarn and the appearance that would be imparted to a hypothetical fabric made from that yarn. Parameters are incorporated into the model that relate appearance properties to actual yarn manufacturing process conditions. The resulting simulated-color coordinates are transformed into the typically radiometrically nonlinear color space of the particular display device to permit the colors to be accurately displayed so as to be properly perceptible to a viewer.

34 Claims, 7 Drawing Sheets

FIG. 1A

LOW MIXING
(HIGH CONTRAST)

FIG. 1B

HIGH MIXING
(LOW CONTRAST)

◯ COLOR 1   ◎ COLOR 2

FIG.2A

SLOW MIGRATION
(LONG RUNNING INDEX)

FIG.2B

RAPID MIGRATION
(SHORT RUNNING INDEX)

PREDICTIVE SIMULATION OF HEATHER FABRIC APPEARANCE

BACKGROUND OF THE INVENTION

1. Field of the Invention

This invention relates to a computer-aided method and apparatus for predictively simulating and displaying the color pattern of a fabric, such as a tufted carpet, made of heather yarn.

2. Description of the Prior Art

1. Yarn and Fabric Manufacture Carpets and other fabrics are formed by the trifling, knitting, or weaving of yarns. A desirable appearance, known as the "heather" appearance, may be imparted to such fabric by making it from "heather" yarn.

Figure 1A:
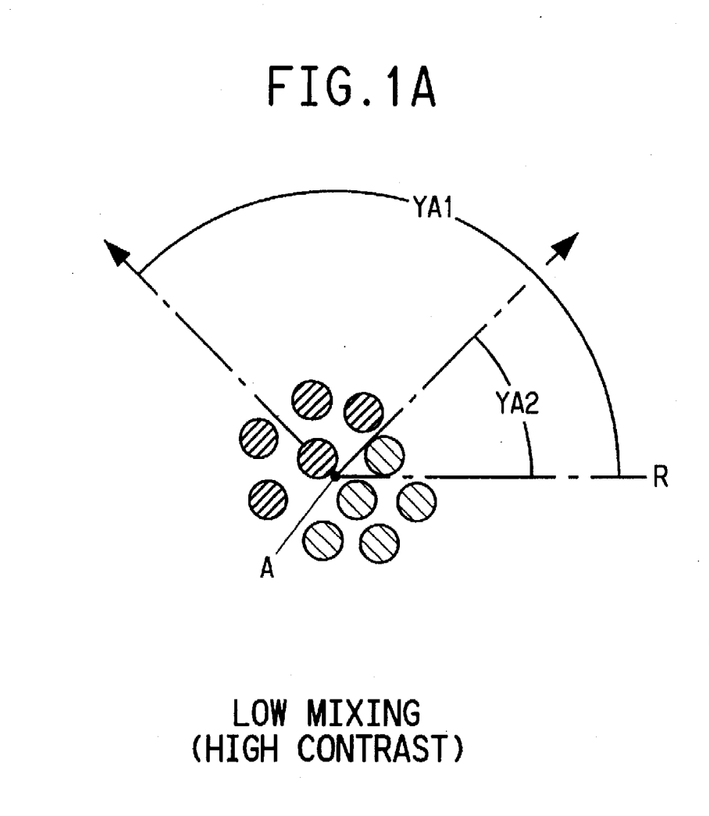
FIGS. 1A and 1B are cross-sectional views of two heather yarns illustrating the difference between yarns respectively having low mixing and high mixing of the yarn components.
Figure 1B:
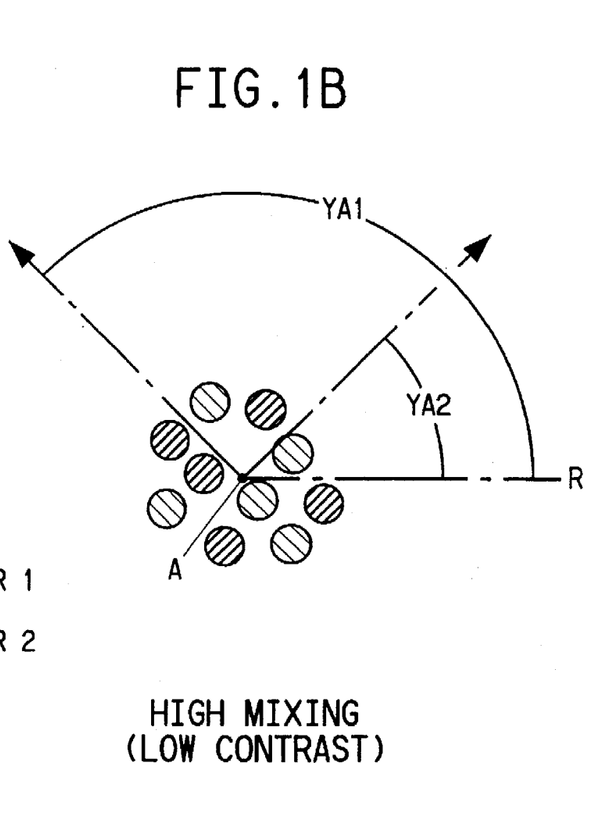
Figure 2A:
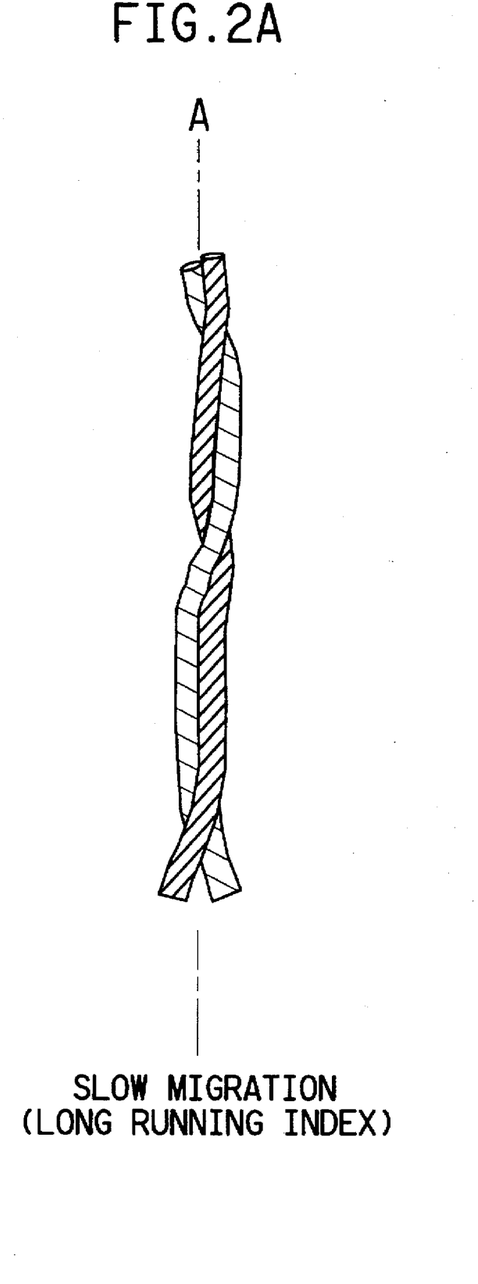
FIGS. 2A and 2B are side views of two heather yarns that illustrate the different rotational relationships as a function of distance along the axis of the yarn.
Figure 2B:
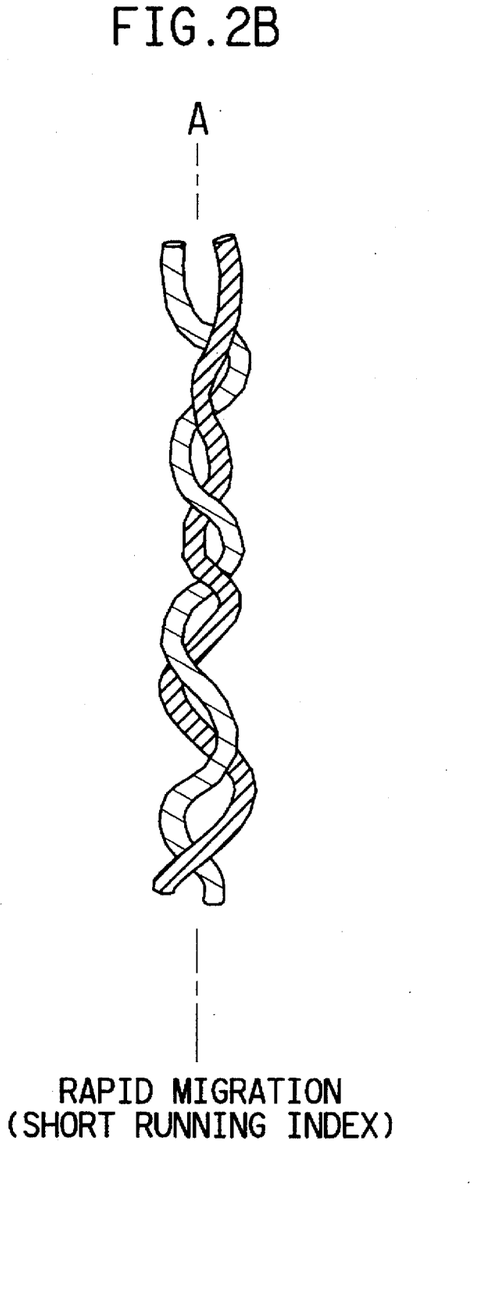

Heather yarn is made by entangling multiple yarn components, or feed yarns, that have different physical and/or chemical properties. The entangling is typically done by air jets impinging on the individual yarn components, which have been placed in close proximity. Typical of such a process is that described in U.S. Pat. No. 4,059,873 (Nelson), assigned to the assignee of the present invention. FIGS. 1A, 1B and 2A, 2B illustrate two variables important to the appearance of a heather yarn. These variables are the degree of mixing of yarn components (FIGS. 1A, 1B) and the rotational relationship of yarn components as a function of axial distance (FIGS. 2A, 2B).

Degree of mixing is a measure of the extent to which individually colored yarn components are physically interspersed at any given axial position along the yarn. The axis of the yarn, which is perpendicular to the plane of the page, is indicated in FIGS. 1A, 1B by the reference character A. FIG. 1A shows a yarn with a low degree of mixing where the individual yarn components of the same color cluster in close adjacency. A low degree of mixing produces a yarn having a large variation in color appearance when viewed from different azimuthal viewing angles, which may be termed "yarn angles". Each respective yarn angle $YA_1$, $YA_2$, may be considered to represent an observing position (indicated by the "eye" symbol) located in a plane perpendicular the yarn axis A measured with respect to an arbitrary reference R. Such a yarn is said to have a high degree of color contrast. FIG. 1B shows a yarn with a high degree of mixing. In this case individual yarn-components of various colors are randomly interspersed across a cross section of the yarn. A high degree of mixing produces a yarn having a small variation in color appearance when viewed from different azimuthal viewing angles. Such a yarn is said to have a low degree of color contrast. The degree of mixing may vary as a function of distance along the yarn axis A.

FIGS. 2A and 2B are meant to illustrate different rotational relationships of yarn components as a function of distance along the yarn axis A. The term "rotational relationship" of the yarn components is meant to include the degree that yarn components physically twist about the yarn axis (and the inherent mixing of yarn components attendant therewith), as a function of distance along the yarn axis. The yarn components twist about each other and about the yarn axis in a random fashion. This random twisting may be represented mathematically. Aspects of this randomness include a factor representing a degree of serial correlation and a gain factor representing a rate of rotation of the yarn components. "Longitudinal migration" is a term used to describe the appearance imparted to the yarn as a result of this random rotational relationship of the yarn components.

In FIG. 2A the yarn has a slow longitudinal migration, that is, the rate of the yarn twisting (degree of mixing) varies slowly along the yarn axis. A slow longitudinal migration produces a yarn having a low variation in color appearance along the yarn axis when viewed from a fixed viewing angle. Such a yarn is said to have a "long running index" or "long run-length characteristic". In FIG. 2B the yarn has a rapid longitudinal migration, that is the rate of twisting varies rapidly along the yarn axis. A rapid longitudinal migration produces a yarn having a high variation in color appearance along the yarn axis when viewed from a fixed viewing angle. Such a yarn is said to have a "short running index" or "short run-length characteristic".

Both the degree of mixing and rotational relationship are direct results of the specific process parameters used in the entanglement process. The heather appearance is created by a variegated mixture of colors in the resulting heather yarn produced by the effects of the degree of mixing and the rotational relationship.

Two basic methods are typically practiced to produce heather colors in yarn. In the first method the yarn components are already colored differently before being air entangled to form the yarn. The color may be produced by dyeing the yarn component or by introducing pigment or other colorant into the polymer from which the yarn component is spun. In the second method yarn components that are essentially colorless but which have different chemical or physical properties are air entangled. Thereafter the entangled yarn is subjected to one or more colorants. Each given colorant preferentially colors a particular yarn component based upon the relative chemical and/or physical properties between the yarn and the colorant. The entangled yarn may be colored before being formed into a fabric or, more typically, may formed into an essentially colorless fabric that can subsequently be colored.

The fabric designer typically has a large number of possible yarn component colors and entanglement process conditions from which to choose. This makes it difficult even for an experienced designer to visualize the appearance that would be created in a fabric formed from a given combination of colors and process conditions.

Designers routinely require trial heathering of sample quantities of yarn and formation of test fabrics to permit evaluation of appearance. Several iterations of selection of yarn combinations and process conditions are usually required for production of usable quantities of aesthetically desirable fabric. Because the production of test fabrics is time consuming, it interferes significantly with the creative process and delays the production of quantities of yarn for its final intended use or sale. The quantities of yarn that are produced for fabric samples are not usable for other purposes and are considered to be costly waste material.

In view of the foregoing it is believed advantageous to provide a method and apparatus whereby the appearance of the color pattern of a hypothetical fabric may be predictively simulated and displayed on a suitable display device before actual manufacture of the fabric itself. A fabric designer would be enabled to decide rapidly on the particular yarn components, colorants and/or entanglement processes necessary to achieve a desired fabric appearance, without the delay and expense of iteratively manufacturing samples of the fabric, thus facilitating the design process.

U.S. Pat. No. 4,984,181 (Kliman, et at.), assigned to the assignee of the present invention, discloses a system for simulating and displaying wanted or unwanted gray-scale patterning in a fabric due to variation in physical or chemical properties of a yarn. This system is not capable of accurately simulating color, or the appearance that would result from entangling yarn components having predetermined physical properties through use of a predetermined heathering process.

Computer-aided-design (CAD) workstations, such as that produced by Info Design Inc. of New York, N.Y. and sold as under the trademark VISION, are available that allow a designer to simulate a fabric made of multiple yarns each having a predetermined colors arranged in a predetermined pattern. Computer-aided-design (CAD) workstations may simulate a pattern based on a spatial prescription that employs the predetermined yarn colors, or may use a heather-like pattern as an input that can be re-colored according to the pure colors of the yarns employed. Similar predictive operations can also be performed by software such as that sold by Adobe Systems, Inc. under the trademark "Photoshop". Versions of this program are available for Apple Macintosh™ and other computers. These workstations can also match a physical sample that has been provided, although this operation in not predictive in nature.

These prior art systems are not believed to be advantageous because they: 1) do not permit accurate simulation of intermediate colors (that is colors intermediate between the yarn component colors), that would result from an entanglement process; 2) do not allow the designer the flexibility of varying the entanglement process parameters over a wide range; 3) do not properly simulate the random or pseudo-random character of heather appearance; and 4) do not provide for simulations that accurately predict fabric appearance.

2. Coordinate Systems for the Specification, Production, and Measurement of Color A number of color coordinate systems have been developed for specifying and measuring colors. Some systems are based directly on the physics of light emission and detection while other systems are based on the psychology of color perception. Still other systems relate to the physics of color production on color display devices, e.g., printers or cathode-ray-tube (CRT) displays. Since an appreciation of all these color coordinate systems is believed necessary to understand the present invention, a brief overview of each is appropriate.

Light Emission and Detection Three different types of color receptors, each having differing spectral responses, are present in the retina of the human eye. The spectral responses of these receptors, combined with filtering by the optical media of the eye, have been determined by psycho-physical testing. These responses were transformed and codified in an international standard known as the "standard-observer" by the International Commission on Illumination (CIE). (CIE, International Commission on Illumination, Proceedings of the Eighth Session, Cambridge, England, 1931, now published as CIE Standard S002/ISO Standard IS10527). The CIE standard observer comprises three tristimulus color-matching functions. In actuality these color-matching functions do not represent the true spectral responses of the eye, but a linear transformation of these responses subject to certain constraints. As used in this patent application colors are referred to the 1964 version of the CIE standard observer, which is obtained from the spectral response over a ten degree field of view (CIE standard S002).

The color-matching functions facilitate the determination of the color of light incident on the eye as the three tristimulus values X, Y, and Z. A single set of such XYZ values, to good approximation, corresponds to one and only one visually perceptible color.

The XYZ tristimulus values may be viewed as the signals that would be obtained from three hypothetical radiometer/filter devices in which the radiometers have perfectly flat spectral responses, i.e., equal radiometric sensitivity at all wavelengths, and the three filters have spectral transmittance characteristics specified by the color-matching functions. As the total light flux entering these devices is varied while holding the spectral distribution constant, each of the tristimulus values remains proportional to the magnitude of the incident light flux. The tristimulus values are thus linear in light flux.

Color Perception The perceived color of a reflective object depends also on the color or spectral distribution of the light that falls on it. In computing the XYZ values of reflective objects, this dependence is taken into account by first forming the product of the spectral reflectance of the object and the spectral distribution of the light source to characterize the light flux incident on the eye, and then multiplying this product by each of the three standard observer functions. The three triple products are each integrated over the range of the eye's response to yield XYZ values for the specified object and light source.

A number of standard light sources have been specified by the CIE to approximate typical observing conditions (CIE Standard S001/ISO Standard IS 10526). CIE standard illuminant D65, which approximates northern daylight, is used herein for reference purposes in the illustrated calculations and simulations. However, the use of this standard illuminant is not to be taken to limit the scope of the invention disclosed herein.

Provided the spectral distribution of the light incident on the eye remains constant, color perception changes little over a wide range of illumination levels. Therefore normalizing the magnitudes leads to a description of color that is closer to the way humans perceive it:

$$x=X/(X+Y+Z), \text{ and } y=Y/(X+Y+Z) \tag{1}$$

The quantities x and y, called chromaticity coordinates, are independent of the magnitude of the light flux incident on the eye provided the spectral distribution remains constant. Frequently, x and y are combined with Y to form a complete color description, the set xyY.

From a perceptual standpoint, however, even the xyY representation remains deficient. The eye can detect smaller differences between colors in certain regions of the XYZ and xyY spaces than it can in others. A barely perceptible, i.e., just noticeable, difference in color is represented by a different distance in disparate regions of these spaces. Therefore, these spaces are not perceptually uniform.

Psychophysical testing has determined the stretches and contractions of XYZ space needed to transform it to a space in which a constant distance represents a just noticeable difference. A simple transformation that performs well in yielding a approximately uniform perceptual color space was discovered by C. D. Reilly and others, published as "Cube Root Color Coordinate System", Journal of the Optical Society, volume 48, pages 736–740, 1958. It has evolved and been adopted as an international standard. The transformed coordinates are known as L*a*b* according to *ASTM Standards on Color and Appearance Measurement*, First Edition, American Society for Testing and Materials (ASTM), Philadelphia, 1984, page 76. These transform coordinates are given by:

$$L^* = 116(Y/Y_n)^{1/3} - 16, \\ a^* = 500[(X/X_n)^{1/3} - (Y/Y_n)^{1/3}], \text{ and} \tag{2}$$

-continued $$b^* = 200[(Y/Y_n)^{1/3} - (Z/Z_n)^{1/3}],$$

where X, Y, and Z are the tristimulus values of a reference white. For values of $X/X_n$, $Y/Y_n$, or $Z/Z_n$ less than 0.01, a different set of formulas is used:

$$L^* = 116\left[f\left(\frac{Y}{Y_n}\right) - \frac{16}{116}\right], \quad (3)$$

$$a^* = 500\left[f\left(\frac{X}{X_n}\right) - f\left(\frac{Y}{Y_n}\right)\right], \text{ and}$$

$$b^* = 200\left[f\left(\frac{Y}{Y_n}\right) - f\left(\frac{Z}{Z_n}\right)\right],$$

where $f(Y/Y_n)=(Y/Y_n)^{1/3}$ for $Y/Y_n$ greater than 0.008856 and $f(Y/Y_n)=7.787(Y/Y_n)+16/116$ for $(Y/Y_n)$ less than or equal to $0.008856; f(X/X_n)$ and $f(Z/Z_n)$ are defined in a similar manner.

Sets of L*a*b* numbers are, due to their inherent radiometric nonlinearity, unsuitable for radiometric computations, but the original spectral distributions and the XYZ system can be used for such purposes. Perceptually, L* corresponds to lightness, a* to redness-greenness, and b* to yellowness-blueness. A polar version of this system, the L*C*h system, has also proven useful because it also allows the separate specification of hue h, and chroma or color saturation C*:

$$h = \arctan(b^*/a^*), \text{ and} \quad (4)$$

$$C^* = (a^{*2} + b^{*2})^{1/2}. \quad (5)$$

Color Display Devices Both a color CRT display and a color printer generate color by separately controlling at least three light sources or light absorbers having different spectral distributions. These distributions generally do not match any of the radiometric and perceptual color spaces previously discussed. In a typical CRT monitor three phosphors, red (R), green (G) and blue (B), are excited by an electron beam. The magnitude of the light flux generated by each of these phosphors is well approximated by the expression $$(D+h_D)^{\gamma_D+c_D}, \quad (6)$$

where $h_D$, $\gamma_D$, and $c_D$ may be empirically determined for each of the phosphors. The quantity D is the drive signal, i.e. a voltage or a current for each of the phosphors R, G, and B. Each of the three light flux magnitudes has a spectral distribution that is characteristic of its generating phosphor composition. The three flux magnitudes are related to the radiometrically determined tristimulus color values XYZ by a three-by-three linear transformation matrix.

In the printing process production of a wide range of color is possible by use of only three absorber dyes: cyan, magenta, and yellow, even though a fourth dye, black, is usually available. Use of black can improve the color match between the printer output and the object being represented. Three third-order polynomials with cross terms may be used to describe the relationship between printer drive signals and tristimulus measurements of the printer's reflective output:

$$S_l = \sum_{i=0}^{3} \sum_{j=0}^{3-i} \sum_{k=0}^{3-i-j} a_{ijkl} U_1^i U_2^j U_3^k, \quad l=1,2,3, \quad (7)$$

where the $U_1$, $U_2$, $U_3$, are the drive signals used for printing each of the three dyes, respectively, and the three coordinates of the printed color in CIELAB space are given by $S_1=L^*$, $S_2=a^*$ and $S_3=b^*$.

SUMMARY OF THE INVENTION

As described earlier heather yarn imparts unique appearance properties to a fabric made using the same. The appearance characteristics of the heather yarn may be varied by selectively adjusting the yarn manufacturing process parameters. This invention relates to a computer-aided method and an apparatus for displaying on a display device an accurate predictive simulation of the appearance of a color pattern of a hypothetical heather yarn fabric comprised of multiple candidate yarn components.

As a general overview, starting from a set of user-selected initial conditions (including input yarn component colors) the invention generates a model representing the appearance of a hypothetical heather yarn and the appearance that would be imparted to a hypothetical fabric made from that yarn. Parameters (including yarn mixing and rotation parameters) are incorporated into the model that relate appearance properties to actual yarn manufacturing process conditions. Thereafter, the resulting simulated color coordinates are transformed into the color space of a given display device, which is typically radiometrically nonlinear. The subsequent conversion into a radiometrically nonlinear color space of the particular display device permits the colors to be accurately displayed so as to be properly perceptible to a viewer.

Color coordinates are typically input using a nonlinear color coordinate system (typically the L*a*b* system) which represents the human visual perception of color. However all simulation computations are performed in a radiometrically linear color space wherein the light flux values are additive.

The simulation involves four basic steps. First, a plurality of heather yarn manufacturing process parameters are selected. These parameters include at least: i) the number of candidate yarn components in the hypothetical heather yarn being simulated; ii) the color of each candidate yarn component; iii) at least one factor governing the mixing of the candidate yarn components; and iv) at least one factor governing the rotational relationship of the candidate yarn components as a function of distance along the yarn axis.

An actual fabric is made of rows (warp) and columns (weft, or fill) of individual yarns. A carpet fabric may be tufted from yarns that run in only one direction, i.e., either rows or columns. A pictorial display of a fabric may be defined wherein individual yarns in the pattern of the fabric are aligned with a given direction in the pictorial display. Thus, the picture elements in a given row within the pictorial display may correspond directly to sequential axial locations along a given yarn. Therefore, as the second step in the method, for each predetermined picture element of the eventual visually perceptible display a set of simulated-color coordinate values representative of a mixture of the colors of the candidate yarn components that contribute to the apparent color perceptible is computed.

To compute the simulated-color coordinate values, first a table of random numbers or pseudo-random numbers is generated. This table of random numbers is used to generate increments in angle to generate a series of yarn angle values. The series of yarn angle values is subjected to a predetermined filter function to represent the random characteristics of the hypothetical heather yarn. Using the yarn angle values, color coordinate values are computed for each predetermined picture element of the color pattern of the hypothetical fabric.

Next, from these color coordinate values, a corresponding display device amplitude value for that picture element is generated. Finally, the display device amplitude values are output to the display device, thereby causing said device to display the simulated color of each picture element.

The predictive color simulation of a hypothetical fabric, in accordance with the present invention, enhances a fabric designer's creative capacity by facilitating the comparison of predictive simulations that result by varying parameters such as yarn component colors, entanglement processes, and methods of fabric construction, so that a fabric design may be selected or determined for implementation as a product for a specific end use. By simulating the appearance of a hypothetical fabric, this invention reduces or eliminates the need for actual preparation of physical samples of fabrics, thus shortening the time required for a designer to select a yarn color combination, heathering process, and method of fabric construction. This invention also reduces the quantity of yarn required, and thus the expense, of preparing samples of fabric created solely for the purpose of fabric designing, since such yarn might otherwise become waste.

The invention is implemented using a computer workstation apparatus having a color display monitor and a color display printer. By use of a colorimetric calibrator device, the outputs of the display device(s) may be adjusted to create visual impressions that are good approximations of the hypothetical fabric that would be produced when a given set of colors for the candidate yarn components, a hypothetical entanglement process, and a hypothetical fabric-construction texture are selected by the user. Stored in the computer are databases containing the color coordinates of candidate yarn components, which may bear subjective names, color coordinates of the display background, the spatial-configuration-generator parameters of the yarn, which correspond to various hypothetical heathering or air-entanglement processes, the color-characterization coefficients needed to adjust the display devices, sets of modulation numbers used to generate the hypothetical fabric construction texture and a table of special random numbers or pseudo-random numbers which, for practical purposes, are used to represent the random characteristics of heather yarn.

BRIEF DESCRIPTION OF THE DRAWINGS

The invention will be more fully understood from the following detailed description, taken in connection with the accompanying drawings, in which.

DESCRIPTION OF APPARATUS

Throughout the following description similar reference numerals refer to similar elements in all figures of the drawings.

Figure 3:
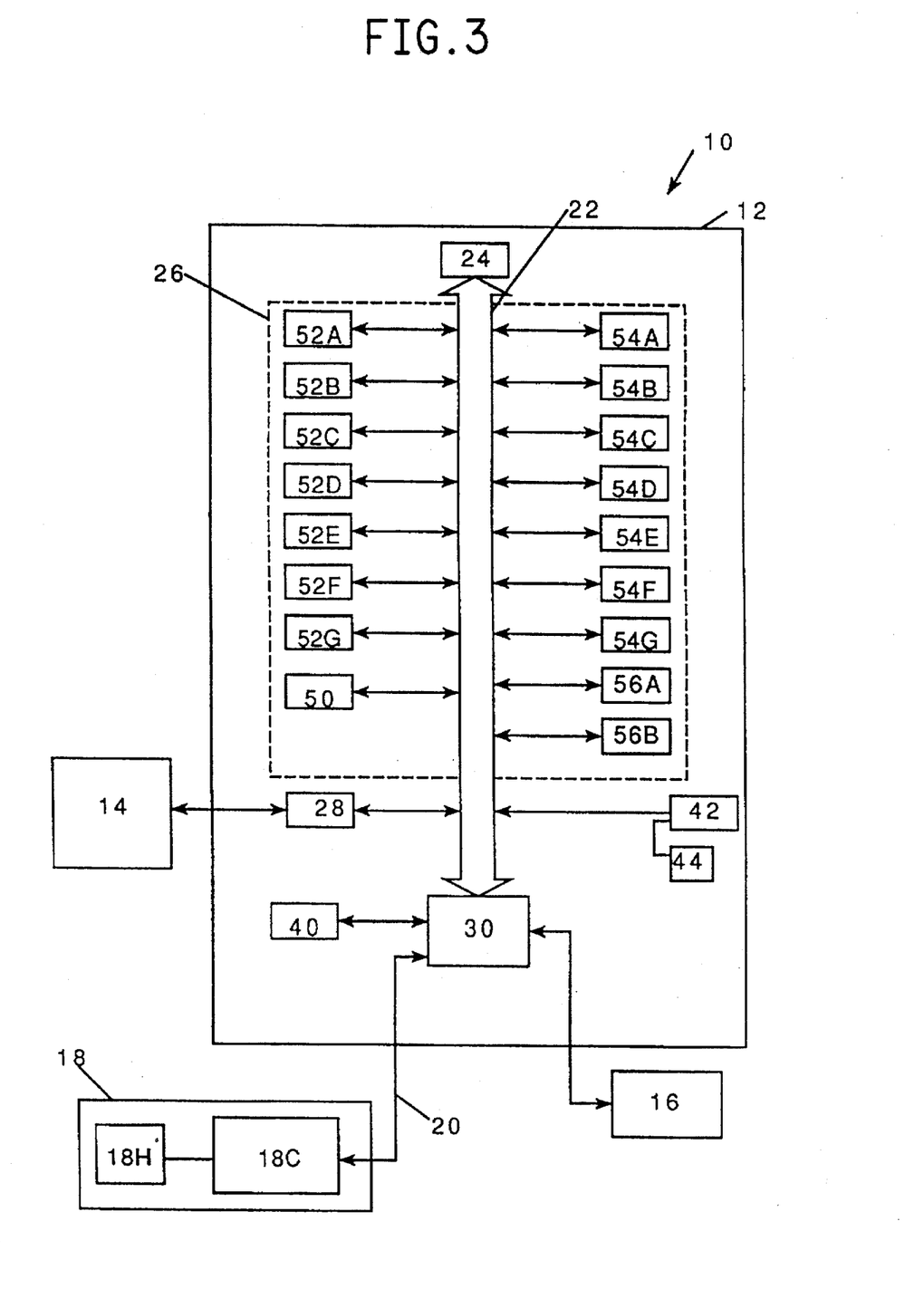
FIG. 3 is a block diagram of an apparatus in accordance with the present invention showing the hardware components and the interconnections between those components.

FIG. 3 illustrates an apparatus 10 in accordance with the present invention configured as a workstation. The workstation 10 comprises a computer system 12 operatively connected to one or more output display devices 14, 16. The computer system 12 may be implemented using a Macintosh™ Model II fx computer from Apple Computer of Cupertino, Calif. The output devices may be optionally implemented using a high resolution color CRT display device and/or a color printer device. Suitable for use as the high resolution color display 14 is the nineteen-inch Super-Mac™ twenty-four bit color display formerly available from SuperMac Technology of Sunnyvale, Calif. The printer 16 may be implemented using a Colortone dye sublimation printer, formerly available from GCC Technologies of Bedford, Mass.

A calibrator unit 18 for calibrating the color of the output device (whether implemented as a CRT display 14 or as a printer 16) is associated with the computer system 12. The calibrator 18 may be implemented using a System Calibrator formerly available from Sequel Imaging of Londonderry, N.H. The calibrator 18 comprises a control unit 18C and a calibrator sensing head 18H. The calibrator 18 interfaces to the computer system 12 via an RS-232 communication link 20. The calibrator sensing head 18H is placed in dose proximity to either the CRT display 14 or the output of the printer 16 to detect reflected light fluxes in the various wavelength bands.

The computer system 12 has a bidirectional databus 22 connecting a central processing unit 24 with a memory 26. The memory 26 may be implemented using any suitable form of read-write memory devices. A random access memory having a capacity of twenty (20) megabytes is sufficient.

The system 12 also includes a high resolution, e.g., twenty-four bit, graphics card 28. Interface circuitry 30 connects the databus 22 to the color printer 16, to the calibrator unit 18 (via the link 20), and to a disk storage subsystem 40. A Winchester disk storage subsystem having an eighty (80) megabyte capacity is sufficient. The high resolution graphics card 28 interfaces the databus 22 to the high resolution color display device 14. Input commands to the central processing unit are effected by a keyboard 42 and a mouse pointing device 44.

The memory 26 is partitioned into a program segment 50 and at least sixteen data storage segments indicated by reference numerals having numerical prefixes 52, 54 or 56. The data storage segments are used for storing various input parameters as well as calculated intermediate and calculated output parameters produced in accordance with the present invention.

The segments of the memory 26 having the reference numeral prefix 52 store various input parameters. These input parameter segments include: a segment 52A for storing the number of candidate yarn components; a segment 52B for storing the color of each candidate yarn component; a segment 52C for storing at least one factor governing the mixing of the yarn components (explained in connection with FIGS. 1A and 1B); a segment 52D for storing at least one factor governing the rotational relationship of the yarn components as a function of distance along the yarn axis (explained in connection with FIGS. 2A and 2B); a segment 52E for storing a set of N random numbers; a segment 52F for storing parameters for implementing a predetermined filter function; and a segment 52G for storing input parameters for simulating a fabric texture. Each memory segment thus comprises means for generating a signal representative of each of the above-listed operator-selected heathering process parameters.

The segments of the memory 26 indicated by the reference numeral prefix 54 store various calculated intermediate parameters produced in accordance with the present invention. These intermediate parameter memory segments include: a segment 54A for storing yarn-angle values; a segment 54B for storing a set of stimulated-color coordinate values representative of a mixture of the colors of the yarn components; a segment 54C for storing a transformation table which transforms color coordinate between different color coordinate systems; a segment 54D for storing a transformation table which relates each color coordinate value to the corresponding color CRT display device 14 amplitude value; a segment 54E for storing a transformation table which relates each color coordinate value to the corresponding color printer device 16 amplitude value; a segment 54F for storing parameters resulting from the simulation of fabric texture; and a segment 54G for storing tables of precomputed color coordinates.

The segments of the memory 26 indicated by the reference numeral prefix 56 store various calculated output parameters produced in accordance with the present invention. These output parameter memory segments include: a segment 56A for storing a set of display device amplitude values to the color CRT 14; and a segment 56B for storing a set of display device amplitude values to the color printer 16.

The central processing unit 24, under control of the program stored in memory segment 50 and in conjunction with one or more of the memory segments 52, 54, 56, defines means for generating various calculated intermediate parameters (stored in the memory segments with the prefix 54) and various calculated output parameters (stored in the memory segments with the prefix 56), all as will be developed in connection with the discussion of the operation of the present invention.

The calculated output parameters are applied to one or both of the display devices 14, 16 to cause the simulated appearance of the color pattern of a hypothetical fabric made of heather yarn to be displayed or printed.

Operation of the Invention The simulation process of the present invention may be more fully understood with reference to the flow diagrams of FIGS. 4 through 8. After the workstation 12 is initialized Coy supplying the required electrical power and following the normal computer startup procedures) and after a suitable delay period for the display devices to stabilize (which may be as long as thirty (30) minutes or more), the simulation process may be initiated.

Figure 4:
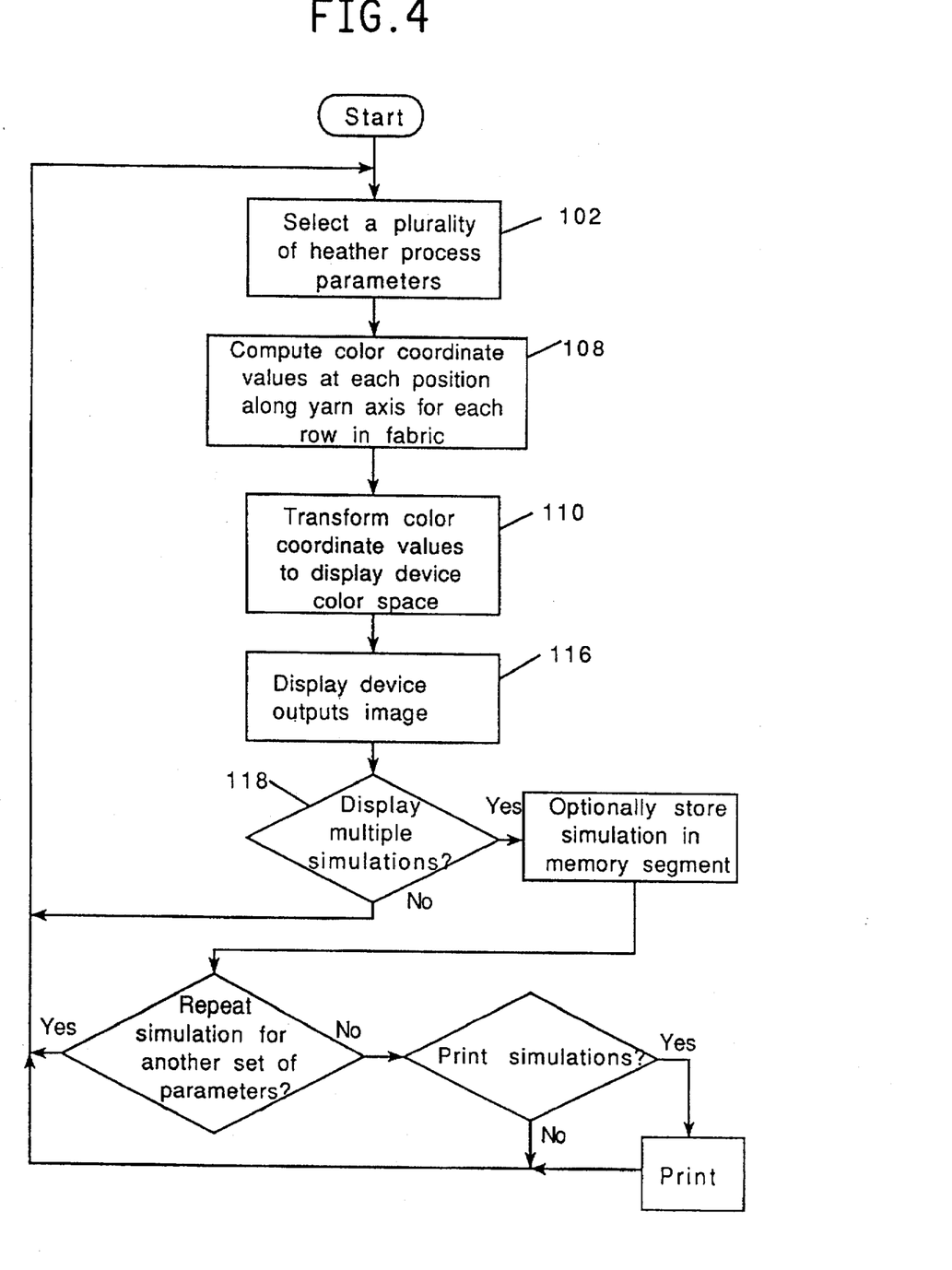
FIG. 4 is a flow diagram of the overall method of the present invention.
Figure 5:
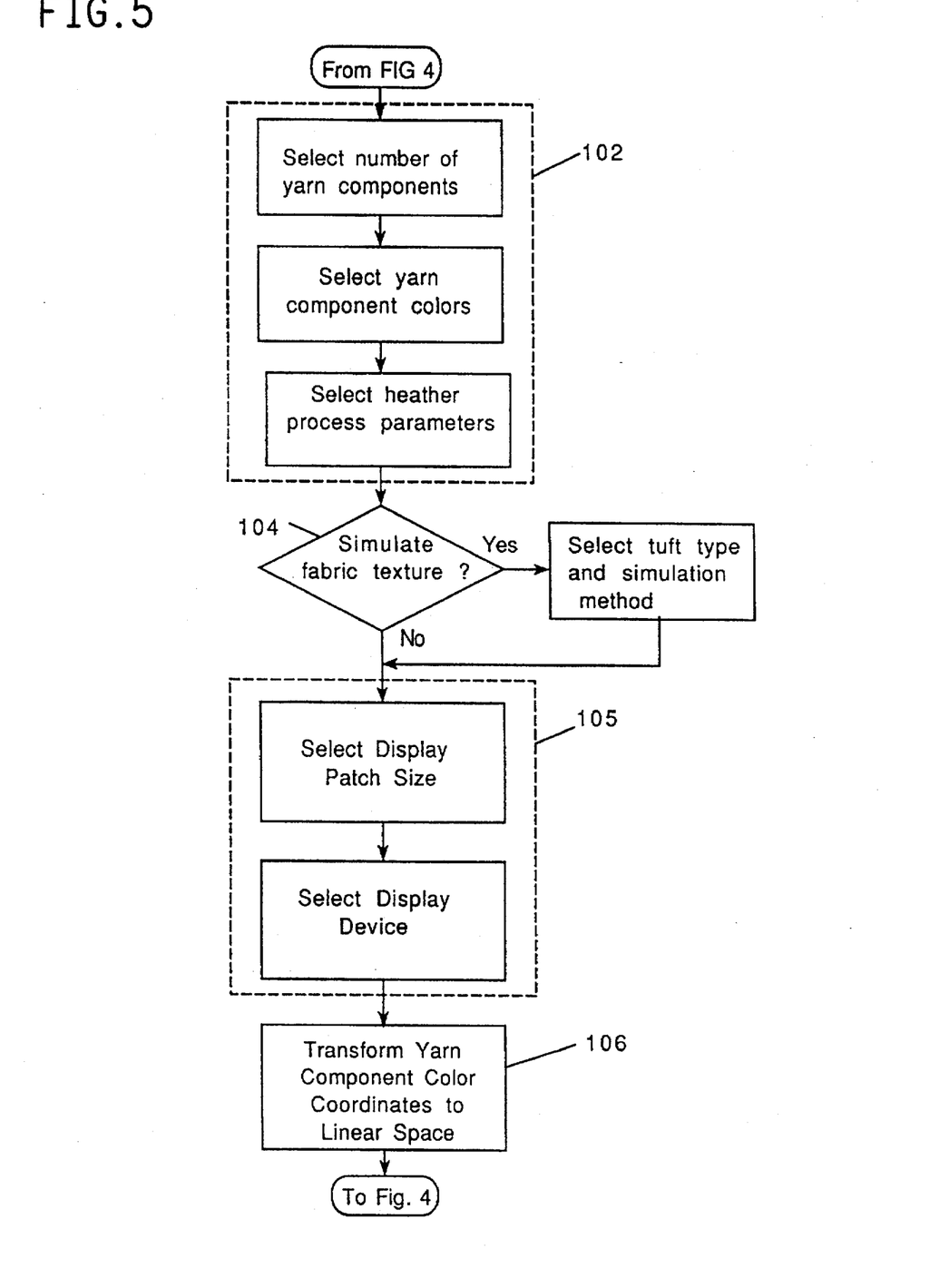
FIG. 5 is a more detailed flow diagram that includes the sequence of operations a human operator must employ in order to implement the first step of the overall method of the invention.

With reference to FIGS. 4 and 5, as a first step 102 a plurality of heathering process parameters is selected by the user. As expressly illustrated in FIG. 5 this step 102 includes the selection of at least the following: the number and the color of each candidate yarn component of the hypothetical heather yarn whose appearance is to be simulated and displayed; and heathering process parameters including at least one factor governing the mixing of the candidate yarn components and at least one factor governing the rotational relationship of the candidate yarn components as a function of distance along the yarn axis. The at least one factor governing the mixing of the candidate yarn components is selected from: (i) a factor representing the degree of mixing of the candidate yarn components, or (ii) a factor representing the variation of mixing of the candidate yarn components as a function of distance along the yarn axis. If desired, both factors may be used. These parameters are stored in memory segments 52A through 52D (FIG. 3).

In a typical implementation the user explicitly specifies the number of candidate yarn components desired. This may be accomplished, for example, via the key board 42 or from a pull-down menu using the mouse pointing device 44. The mouse pointing device 44 is also employed to select, from another pull-down menu, a specifically named heathering process. Implicitly associated with each specifically named heathering process are a value for the yarn-component mixing factor and a value for the governing the rotational relationship of the candidate yarn components as a function of distance along the yarn axis.

The selection of the colors of the yarn components may be typically done by any one of three methods. First, the user may enter, via the keyboard 42, the numerical color coordinates of each candidate yarn component. The numerical color coordinates may be specified using any of the above-discussed color coordinate systems. The color coordinates may be specified in a radiometrically linear color space (such as the XYZ system) or a radiometrically non-linear color space (such as the L*a*b* system). The user may alternatively select the desired color of each yarn component from one of the standard-named yarn component colors that may be provided in a pull-down menu. As another alternative the user may select the desired color of the yarn component from a color palette on the display monitor 14. It should be understood that the selection of the colors of the yarn components encompasses the selection of a colorant that may be applied each uncolored candidate yarn component which has a predetermined susceptibility to that specific colorant.

At this point, as indicated by the decision block 104 (FIG. 5), the user may optionally select a surface texture to impart a more realistic appearance to the simulation. As will be discussed herein this texture may be artificially synthesized by specifying relative modulation intensities over a single period of a periodic fabric construction (such as a carpet raft) or the modulation intensities may be taken from a camera-acquired image of a real fabric.

The last choices for the user are indicated by the block 105 (FIG. 5). These choices include the specification of the display patch size (which may typically be made as a choice of six different sizes) and the selection of the particular display device (i.e., either the CRT display 14 or the printer 16).

If the selection of color of each candidate yarn component is performed by specifying color coordinates in a radiometrically non-linear color space the numerical color coordinates of each candidate yarn component (stored in memory segment 52B) must be transformed by the CPU 24 into corresponding values in a radiometrically linear color space. Although not a user selection, transformation is nevertheless indicated on FIG. 5 by block 106. A radiometrically linear color space is used because only in such linear coordinates can light fluxes be properly combined according to the laws of physics, as will be described. The transformation is typically accomplished using a transformation table of memory segment 54C.

The second step 108 (FIG. 4) in the creation of the simulation is the computation of a set of simulated-color coordinate values representative of a mixture of the colors of the candidate yarn components that contribute to the apparent color for each predetermined picture element of the hypothetical fabric. Since an actual fabric is made of rows (warp) and columns (weft, or fill) of individual yarns a pictorial display of a fabric may be defied in a row-by-row manner wherein individual yarns in the pattern of the fabric correspond to individual rows of picture elements in the pictorial display. In a tufted carpet, on the other hand, a tuft row may correspond to one or more rows of picture elements. Thus, the picture elements in a given row within the pictorial display correspond directly to sequential axial locations along a given yarn. A more detailed flow diagram of the steps involved in this computation of the set of simulated color coordinate values is set forth in FIG. 6.

As a preparatory step, indicated in block 130 (FIG. 6), the CPU 24 under program control selects from the data base of random numbers stored in the memory segment 52E (FIG. 3) to generate a series of yarn angle values. As illustrated in FIGS. 1A and 1B each respective yarn angle value may be considered to represent an observing position located in a plane perpendicular the yarn axis A at a respective location therealong. Each yarn angle value is selected in accordance with the factor (stored in the memory segment 52D) governing the rotational relationship of the candidate yarn components as a function of distance along the yarn axis. Thus, the view presented from each yarn angle value represents the effect on the appearance of the hypothetical fabric due to the random twisting of the yarn components. The yarn angle values are stored in the memory segment 54A.

Figure 6:
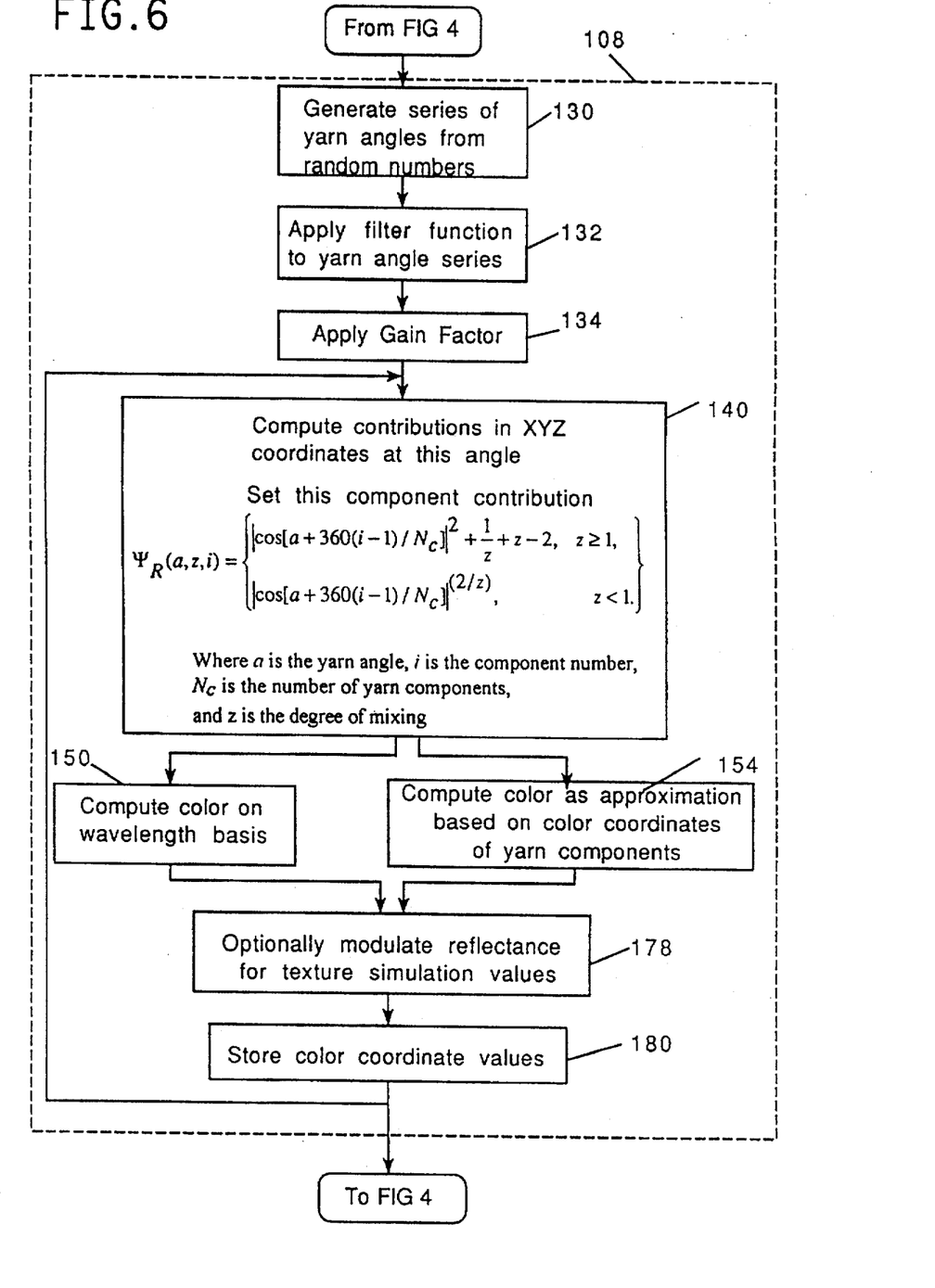
FIG. 6 is a more detailed flow diagram of the second step of the overall method of the invention showing the steps involved in the computation of the color coordinates.

The yarn angle values may be generated by subjecting the series of yarn angles (stored in the segment 52E) to a predetermined filter function which establishes a degree of serial correlation. This is indicated in block 132 (FIG. 6). More particularly, the predetermined filter function is applied to n adjacent yarn angle numbers in a series of N yarn angles generated from N random numbers, where 1<n<N. The predetermined filter function may be used to directly generate the yarn angle values or to generate incremental changes in yarn angle with distance along the yarn axis. The predetermined filter function is preferably a moving average of n adjacent numbers in the series of N numbers. It should be appreciated that, equivalent to the foregoing, the predetermined filter function may be applied to the series of N random numbers prior to generating the series of N yarn angles.

It will be appreciated that each of these yarn angle increments may further be multiplied by a gain factor, as indicated in the block 134 (FIG. 6). The larger this gain factor, the shorter will be the length of the runs of yarn that exhibit essentially similar appearance when viewed from a constant direction (i.e., from a given observing position). The yarn angle increment gain factor is therefore related to the fabric's run-length characteristic. The gain factor may be applied regardless of whether the filter function is employed.

As indicated by the block 140 a yarn component contribution function is employed to compute the relative light flux contributions of the candidate yarn components at each given yarn angle. At each axial location along the yarn axis, as the yarn twists and turns, a different apparent color would appear to an observer situated at a given yarn angle (i.e., observing position). The filaments of each candidate yarn component that are visible or are physically proximate to filaments that are visible from that yarn angle each contribute to the absorption of light. The apparent color thus depends on the number of filaments of each of the candidate yarn components that is visible from each yarn angle.

The component contribution function is calculated as follows:

$$\Psi_R(a,z,i) = \begin{cases} |\cos[a + 360(i-1)/N_C]|^2 + \frac{1}{z} + z - 2, & z \geq 1, \\ |\cos[a + 360(i-1)/N_C]|^{(2/z)}, & z < 1. \end{cases} \quad (8)$$

$$\Psi(a,z,i) = \frac{\Psi_R(a,z,i)}{\sum_{j=1}^{n} \Psi_R(a,z,j)} \quad (9)$$

As shown by the formulae (8) and (9) the component contribution function depends on the number of yarn components (stored in the memory segment 52A and indicated by the variable "$N_c$") and the factor governing the degree of mixing (stored in the memory segment 52C and indicated by the variable "z"). In the limit of a completely mixed yarn (i.e., highest degree of mixing) all yarn components contribute equally regardless of yarn angle. In this case the resulting hypothetical fabric appears to have a uniform color. In the limit of no mixing at all (i.e., lowest degree of mixing) a given yarn angle may show a contribution from only one of the candidate yarn components. It will be appreciated that the degree of mixing may be held constant for an entire hypothetical fabric being simulated, or alternately, the degree of mixing may readily be made to vary along the yarn's axis.

Once the contribution of each candidate yarn component has been determined it remains to compute the color corresponding to that specified mixture of candidate yarn components. Either of two methods may be used.

The first method, indicated by the block 150 (FIG. 6), is termed the full spectrum approach. In the full spectrum approach the reflectance spectrum of the mixture of yarn components is computed on a wavelength-by-wavelength basis, given the reflectance spectra of the component yarns. The contribution at each wavelength from each component is weighted by the fractional contribution of that component. The contributions are summed and divided by the same of the weights to determine the reflectance spectrum of the mixture. This procedure is known as wavelength by wavelength linear superposition. This method, which can potentially generate the more accurate color coordinates, is quite computer resource intensive, owing to the computer time needed to calculate the color contribution of each individual wavelength, plus the extra memory required to store reflectance spectra and labor of implementing the needed data base. Accordingly, it is not the more preferred method.

Figure 7:
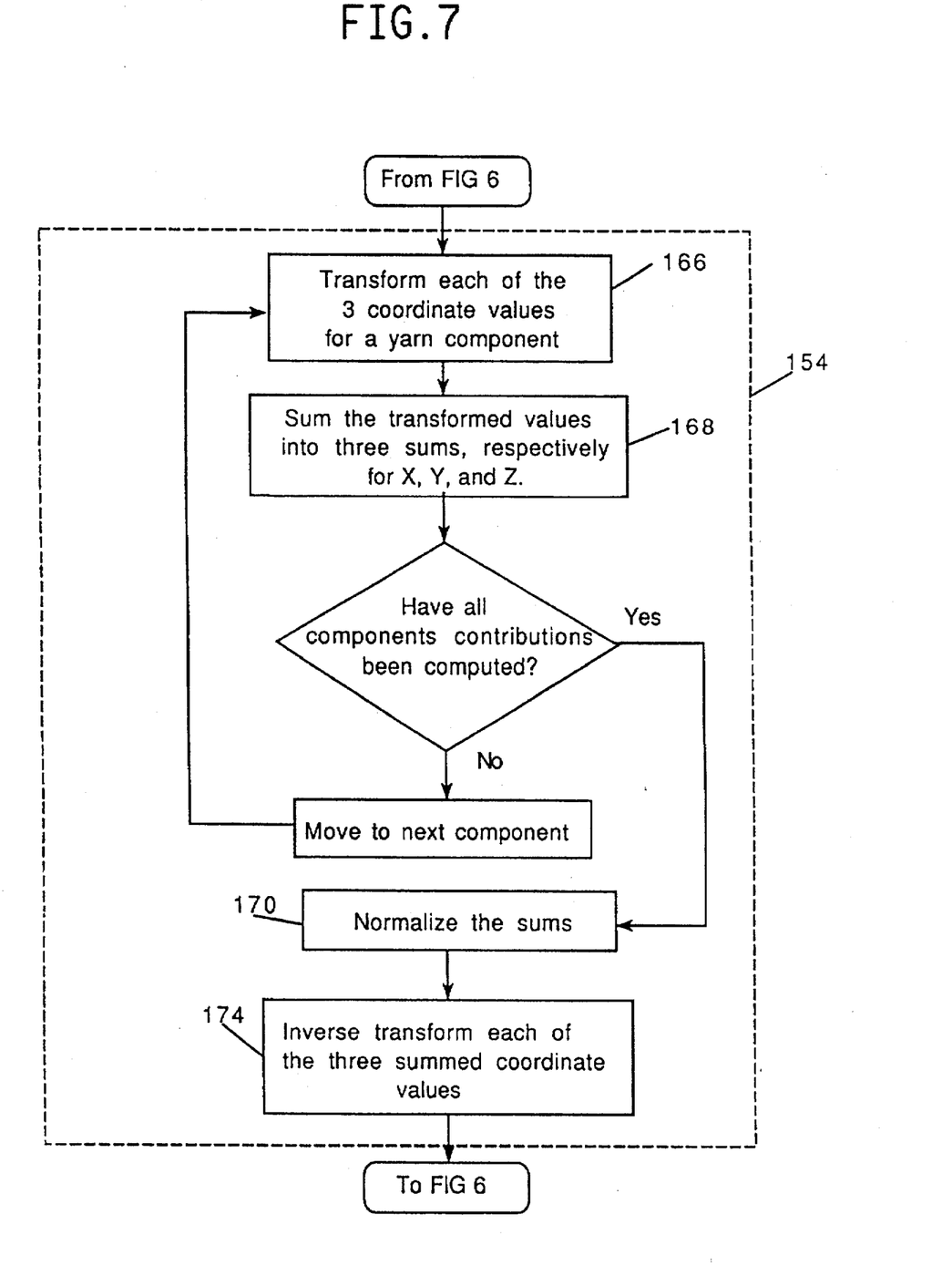
FIG. 7 is a more detailed flow diagram that illustrates the computation of the color coordinates.

A second method, generally indicated by the block 154 and in more detail in FIG. 7, computes the color coordinates corresponding to the mixture of yarn components as an approximation based on the color coordinates of the yarn components. In general, for each point along the axis of the yarn the calculations of the contribution in $X$, $Y$ and $Z$ are summed (block 168, FIG. 7) for each yarn component at the previously determined yarn angle randomly selected to correspond to that point along the yarn axis. The X, Y and Z sums are then normalized (block 170). The component contributions are normalized by dividing each contribution by the sum of the individual contributions. The normalized contributions are then summed. The effects of multiply scattered light are accounted for by a transformation function (block 166) which is applied to the component contribution prior to summing. An inverse transform is then performed on the summed color coordinates (block 174).

In this method the X, Y and Z coordinates take the place of the reflectance spectrum values at each wavelength. The values may indeed be considered as spectrally resolved values, albeit distorted by a spectrometer (the human eye) having extremely poor spectral resolution and shift-variant response (see *Deconvolution—With Applications in Spectroscopy*, P. A. Jansson, ed. Academic Press, New York, 1984, Chapters 1 and 2). In the case of the CIE standard-observer color-matching function, the spectrometer's response even has a double peaked wavelength response.

If yarn filaments of each contributing component are poorly mixed, i.e., spatially separated, as in a yarn having low mixing, light incident on a given filament, after scattering and absorption within that filament, interacts primarily with filaments from the same component. Therefore, light leaving the yarn bundle that has interacted primarily with filaments having the same component type has essentially the same reflectance spectrum and color as light leaving a yarn having only filaments of that component type, i.e., equivalent to a one-component yarn. In this case simple linear superposition of the fluxes leaving the components visible at the specified observation angle accurately characterizes the flux entering an observer's eye corresponding to a given distance along the yarn's axis. Here it is assumed that the eye's spatial resolution is limited so that the fluxes of the unmixed but nevertheless close components are not resolved.

If yarn filaments of each contributing component are highly mixed characterization of the light leaving the yarn bundle must account for the spectral and colorimetric effects of scattering by multiple absorbers having different spectral absorption characteristics. Complete and accurate characterization leads to both theory and computation that are intractable. A number of methods have been developed that are sufficiently accurate to be useful.

The present invention contemplates the use of an approximation to characterize the effects of mixing. The complexity of the computation of color coordinates depends on the factor governing the degree of mixing. If the mixing factor is low the transformation and inverse transformation steps shown in FIG. 7 may not be needed. For ranges of mixing found in typical commercial heather yarn, however, the transformation and inverse transformation have been found necessary.

In the preferred embodiment, the transformation function (block 166) utilizes the so-called Stearns-Noechel method, published as Stearns, E. I., and Noechel, F., *Am. Dyestuff Reptr.* 33, 1 (1944).

According to the Stearns-Noechel method, the contributing component values must each first be transformed according to the function:

$$R'(R) = \frac{1-R}{M(R-0.01)+0.01}, \quad (10)$$

where R is the input value, and R' is the output value before being summed. Correctly the reflectance values ought to be summed on a wavelength-by-wavelength basis. For practical purposes, the values employed are X, Y, and Z values of the individual components. When completed, the sums are inverse transformed according to the function $$R(F,M) = \frac{.01F(M-1)+1}{MF+1}, \quad (11)$$

where F is the accumulated R' component contributions for each coordinate. These operations are summarized in the flow chart of FIG. 7. A single value M for all the color primaries X Y, and Z is established through trial and error by visual subjective observation of simulations employing a variety of yarn colors and processes. A typical correction factor M is 0.45.

Thus for the $N_c$ sets of $X_i$, $Y_i$, and $Z_i$ tristimulus values of an $N_c$ component yarn, i=1, ..., $N_c$ the resulting color of the combined components is given by the tristimulus coordinates:

$$X = R\left(\sum_{i=1}^{N_c} R'(X_i), M\right), \quad (12)$$

$$Y = R\left(\sum_{i=1}^{N_c} R'(Y_i), M\right), \quad (13)$$

and $$Z = R\left(\sum_{i=1}^{N_c} R'(Z_i), M\right). \quad (14)$$

The Stearns-Noechel function is itself an approximation. Superimposing the addition approximation of XYZ, instead of wavelength-by-wavelength summing, in principle decreases the accuracy further. Considering the poor simulations that were noted by use of the simple linear superposition, the substantial improvements resulting from use the Stearns-Noechel XYZ approximation, and the difficulty of any other known approaches, the approximation appears well justified by its practicality and favorable results.

Texture Simulation With reference to block 178 (FIG. 6), as each radiometrically linear color coordinate is determined as a function of distance along the yarn axis, it may be multiplied by a modulation coefficient. The modulation coefficient may be an array of numbers that is a function of the two-dimensional spatial coordinates of a fabric texture pattern. Upon completion of a simulation having many traverses of yarn the visual effect this modulation is one of simulating the appearance of fabric texture such as, but not limited to, the tufts of a tufted carpet. To produce the most visually realistic effect it may be necessary to pre-process the array of numbers to enhance texture edges or to modify the statistical distribution of the array of numbers. The color coordinate values resulting from the texture simulation is stored in memory segment 54F.

A difficulty arises in superimposing a tuft texture on the heather image. It has been found that if the texture image is taken simply as a modulation coefficient array having values between zero and one the resulting modulated image has lightness significantly below the computed values. The simulated image will appear too dark and highlights will appear too bright.

By utilizing a function which compresses the dynamic range of the image for values of γ greater than unity a more realistic appearance may be realized. The compression function is:

$$U(i) = \frac{N\left[\left(\frac{i}{N}\right)^{\gamma_T} - \gamma_T\left(\frac{i}{N}\right)\right]}{1 - \gamma_T}, \quad i = 0, \ldots, N. \quad (15)$$

In this equation, a parameter $\gamma_T$ is defined to control the degree of flattening desired. The quantity U(i) is the processed texture value, N is the number of evenly spaced intervals between discrete values defining the range of this function, which is implemented as a look-up table, and i is the texture value to be processed, which is assumed to have been digitized to N+1 possible values. In the preferred implementation N has a value of 255.

At this point (block 180, FIG. 6) a set of color coordinate values, in a radiometrically linear coordinate space, for each picture element of the display is stored in memory segment 54B. A group of such elements, typically square, may derive their colors from the single color coordinate set corresponding to a single yarn angle. The spatial distribution of colors within the group may be obtained from the single color coordinate set by performing the above-described texture-modulation operation (block 178).

It will be appreciated that independent computation of all the colors needed for the simulation may be time consuming, thereby not providing the rapid visual feedback that effective use of a simulator would require. To optimize the effective computation speed, it is typical in such cases to provide look-up tables whereby color coordinates may be pre-computed and stored corresponding to a limited set of cases. Although it is not the only possible method it has been found that it is especially convenient to pre-compute such colors as a function of a small set of yarn angles and store them in a table. This table may be stored in memory segment 54G. By this means the computer is able to look-up from the table the color required at any given random yarn angle at any given position along the axis of the yarn. It has been found that an acceptable simulation is produced when the color coordinates are computed at five degree increments of yarn angle. The modulation coefficients (to simulate texture) may be added as another dimension of the table. An acceptable simulation of tufted carpet fabric texture is produced when sixteen levels of modulation coefficients are used. If desired a variation of mixing of the candidate yarn components as a function of distance along the yarn axis may be represented by adding an additional dimension to the table.

As indicated in block 110 (FIG. 4) the next step in the method is to generate a set of display device amplitude values corresponding to the color coordinate values for each predetermined picture element of the color pattern of the hypothetical fabric. Color display devices, whether cathode-ray-tube monitors, color printers, or other devices, are usually radiometrically nonlinear in their response. They typically respond to a set of three or more drive signals, which may be voltages or currents, that determine, for example, how intense a set of electron beams should be to excite a set of colored display screen phosphors, or to determine how much heat should be applied to a print head to transfer a given amount of colored dye to a paper, or to determine how much colored ink should be dispensed from one or more ink jets.

The relationship between the radiometrically linear color coordinates of a displayed color and the drive signals required to produce that color is usually complex, and is dependent on the physical properties and laws governing the operation of the particular display device. Systems are available commercially to produce accurate colors on displays of various types. Typically they involve characterization of the display device based upon a model that may have a basis in the physical laws governing the device. Alternatively, they may be empirically derived via polynomial regression, neural-network modeling, or by other means, based upon colorimetric determination of the colors produced by the display for a number of test combinations of drive signal values.

In the preferred implementation the computed color coordinates are converted to display device drive signals in the following manner.

As discussed in the Background for a CRT device the magnitude of the light flux generated by each of the screen phosphors is well approximated by the expression:

$$(D+h_D)^{\gamma_D}+c_D, \quad (6)$$

where $h_D$, $\gamma_D$, and $c_D$ are empirically determined, the subscript D representing the drive signal, i.e., a voltage or a current for each of the phosphors R, G, and B. The three flux magnitudes are related to the radiometrically determined tristimulus color values by a three-by-three linear transformation matrix. Accounting for the nine values of $h_D$, $\gamma_D$, and $c_D$ plus the matrix coefficients leaves a set of eighteen constants that requires determination. A Marquardt-Levenberg algorithm [Marquardt, D. W., J. Soc. Ind. Appl. Math. volume 11, 431–441 (1963) and Press, W. H., Flarmery, B. P., Teukolsky, S. A., and Vetterling, W. T., *Numerical Recipes*, Cambridge University Press (1986), p. 523] may be used to find the optimum values of these constants by minimizing the distance between the observed colors and the model-predicted values in L*a*b* space for a set of twenty-eight color measurements that were made from the monitor face via the calibrator 18. Typical root-mean-square error of the fit is on the order of 2.1 DE units which specify distance in L*a*b* space.

The display device drive signals for the CRT display 14 are stored in the memory segment 54D.

In the case of a color printer it is not feasible to fit a simple physical model to characterize color output. A color printer may be characterized by the use of a polynomial model. Three third-order polynomials with cross terms have been found to adequately describe the relationship between printer drive signals and tristimulus measurements of the printer's reflective output:

$$S_l = \sum_{i=0}^{3} \sum_{j=0}^{3-i} \sum_{k=0}^{3-i-j} a_{ijkl} U_1^i U_2^j U_3^k, \quad l=1,2,3, \quad (7)$$

where the $U_1$, $U_2$, $U_3$, are the drive signals used for printing each of the three dyes, respectively, and the three coordinates of the printed color in CIELAB space are given by $S_1=L^*$, $S_2=a^*$ and $S_3=b^*$. The values of the sixty constant coefficients $a_{ijkl}$ may be determined by minimizing in L*a*b* space the sum-squared distance between the $S_l$ values and colors produced by the printer:

$$\Delta E^2 = \sum_{m=1}^{M_T} \sum_{l=1}^{3} (S_{lm}-T_{lm})^2, \quad (16)$$

where $T_{lm}$ is the $l^{th}$ L*a*b* coordinate of the $m^{th}$ sample of the printer color gamut. The quantities $S_{lm}$ are the $l^{th}$ L*a*b* coordinates predicted by the polynomial model value computed from the drive signals $U_1$, $U_2$, and $U_3$ used to generate the $m^{th}$ sample. The quantity $M_T$ is the number of samples used to characterize the color gamut of the printer.

The display device drive signals for the color printer 16 are stored in the memory segment 54E.

Typical root-mean-square error of the fit is on the order of 3.2 ΔE units. The least-squares fitting was accomplished by solving the so-called normal equations in standard fashion, such as the techniques described in Margenan, H. and Murphy, G. F., *The Mathematics of Physics and Chemistry*, D. Van Nostrand, New York (1956) at page 518. Each time the system needs to print a new color the polynomials need to be inverted. A simple steepest-descent routine, such as that described in Appendix C of Martin, B. R., *Statistics for Physicists*, Academic Press, New York 1971 may be used to iteratively find the drive values. A Marquardt-Levenberg algorithm could invert these polynomials faster. Alternatively, the Marquardt-Levenberg algorithm could be used to fit polynomials in the L*a*b* coordinates to the drive values by minimizing the error in L*a*b* space. Then only iteration-free polynomial evaluation would suffice for computing drive values when minimum computing time is most critical. Printer-color computation, however, is not a time-limiting step at present, so little incentive exists to accelerate this computation. The computation is not time-limiting because the look-up tables used to generate the image are application based. Specifically, these color-vs-yarn-angle tables are tailored to the needs of heather images, in contrast to the general needs of reproducing images with arbitrary content.

For the purpose of characterizing the printer, a pair of prints containing a total of 575 squares, each of which measured nominally one-half inch by one-half inch, was generated. By varying each of the three printer drive signals over its entire dynamic range in eight approximately equal steps these squares thus sample the entire print gamut. Without redundancy this method would yield (8×8×8) (or 512) combinations of drive-signal values. The 575−512=63 redundant outputs resulted from the requirement of maintaining a pseudo-random drive sequence. Such a sequence was necessary to minimize the effect, on a given square, of print-head temperature bias caused by accumulated heat from temporally and spatially adjacent squares.

A look-up table may be used instead of a polynomial model to determine cyan-magenta-yellow printer values from computed XYZ coordinates. If the lookup table were based on simple interpolation between measured input/ output coordinate sets the systematic error associated with print-head heating and heat diffusion would be preserved as bias in future prints. The arrangement of the printer characterization pattern, no matter what pattern is designed or chosen, would thus adversely affect the accuracy of print colors. Furthermore, the look-up table would capture and detrimentally apply stochastic variations in characterization pattern data to future print colors. Averaging measurements of numerous characterization patterns, each pattern having a different color arrangement, could partially overcome this problem, but would lead to printing and measurement of an unacceptably large number of prints.

From the above discussion it may be appreciated that a model-based method has greater accuracy potential because the expected (and observed) relationship between printer input and output is smooth. Note that the typical 3.2 ΔE quoted is not primarily influenced by the model's conformance to the true printer characteristic. It is rather a measure of stochastic printer variation and of characterization-square placement relative to neighboring colors. The ΔE that would represent the accuracy of the model's characterization of the printer at the time the pattern was printed is considerably less than the quoted value. Because look-up tables offer the benefit of rapid computation, the advantage of both model-based and lookup based methods may be achieved by using the model to compute the look-up table values. Accordingly, such look-up tables, based upon mathematical models, may be used to transform the radiometrically linear color coordinate values to the display device (whether CRT or printer) drive signals. These tables are stored in memory segments 54D or 54E, respectively.

The computations described above may be repeated for each position along the yarn axis to generate and display the simulated-color coordinate values for each of a plurality of adjacent picture elements thereby to define a single yarn traverse across the hypothetical fabric. A plurality of yarn traverses across a hypothetical fabric may thereby define a hypothetical fabric pattern. For the situation where the hypothetical fabric is a tufted carpet fabric each yarn traverse may comprise a tuft row across the carpet.

As indicated at the block 116 (FIG. 4), as a final step of the method the set of display device amplitude values is output to the selected display device. The display device displays the simulated colors of each picture element. As a result the color appearance properties of a hypothetical fabric made of heather yarn comprised of the multiple candidate yarn components is displayed.

As indicated by the block 118 the method may optionally provide the capability to simultaneously display, in side-by-side relationship, multiple simulations. Each simulation may represent a particular choices of candidate yarn-component colors, heathering process parameters, and/or fabric textures. Each simulation may be variously sized, if desired. This capability enables the user to more readily compare various candidate yarn component color combinations, hypothetical heathering processes and fabric textures so that desired candidates may be chosen for preparation of either small physical samples or commercial quantities of yarn.

Those skilled in the art, having the benefit of the teachings of the present invention as hereinabove set forth may impart various modifications thereto. Such modifications are to be construed as lying within the contemplation of the present invention as defined by the appended claims.

What is claimed is:

1. A computer-aided method for predictively simulating and displaying on a display device a color pattern of a hypothetical fabric made of heather yarn which comprises multiple candidate yarn components, the heather yarn imparting appearance properties to the hypothetical fabric, said method comprising the steps of:
   a) selecting a plurality of heathering process parameters including at least:
      i) the number of candidate yarn components,
      ii) the color of each candidate yarn component,
      iii) at least one factor governing the mixing of the candidate yarn components, and
      iv) at least one factor governing the rotational relationship of the candidate yarn components as a function of distance along the yarn axis;
   b) for each predetermined picture element of the color pattern of the hypothetical fabric, computing a set of simulated-color coordinate values representative of a mixture of the colors of the candidate yarn components that contribute to the apparent color perceptible at a yarn angle;
   c) for each predetermined picture dement of the color pattern of the hypothetical fabric, generating a set of display device amplitude values corresponding to the color coordinate values for that picture element, and
   d) outputting the set of display device amplitude values to the display device, thereby causing said device to display the simulated color of that picture element.

2. The method of claim 1 wherein step b) farther includes generating a yarn-angle value selected in accordance with the rotational relationship factor, and in accordance with the yarn-angle value, computing the set of simulated-color coordinate values.

3. The method of claim 1 wherein step a) is performed by the selection of a heathering process which implicitly denotes a predetermined set of heathering process parameters.

4. The method of claim 1 wherein step a) is performed by the explicit selection of each individual heathering process parameter.

5. The method of claim 4 wherein the color of each candidate yarn component is selected from a menu having a predetermined plurality of colors listed therein.

6. The method of claim 4 wherein the color of each candidate yarn component is selected from a color palette on a display, the display having a predetermined plurality of colors displayable thereon.

7. The method of claim 1 wherein the selection of the color of each candidate yarn component in step a) ii) is performed by specifying the color coordinates in a radiometrically linear color space.

8. The method of claim 1 wherein the selection of the color of each candidate yarn component in step a) ii) is performed by specifying color coordinates in a radiometrically non-linear color space, the method further comprising the steps of:
   i) transforming the radiometrically non-linear color coordinates to a radiometrically linear color space, and
   ii) using the radiometrically linear coordinates in the computation of the simulated color coordinate value of step b).

9. The method of claim 1 wherein each candidate yarn component of the heather yarn is uncolored, and wherein the selection of the color of each candidate yarn component in step a) ii) is performed by specifying the colorant to be subsequently applied each yarn component, each candidate yarn component having a predetermined susceptibility to a specific colorant.

10. The method of claim 9 wherein the susceptibility of each uncolored candidate yarn component to at least one colorant is determined by the chemical or physical properties of the candidate yarn component and of the colorant.

11. The method of claim 1 wherein the yarn-angle of step b) is generated in accordance with a predetermined filter function applied to n adjacent yarn angles in a series of N yarn angles generated from N random numbers, where $1<n<N$.

12. The method of claim 1 wherein step b) is generated in accordance with a predetermined filter function applied to n adjacent yearn angles in a series of N yarn angles generated from N random numbers, where $1<n<N$ to specify incremental changes in yarn angle with distance along the yarn axis.

13. The method of claim 1 wherein the a predetermined filter function is a moving average of n adjacent numbers in a series of N random numbers, where $1<n<N$.

14. The method of claim 1 wherein the simulated-color coordinate values of step b) are computed in accordance with both the yarn-angle and the mixing factor.

15. The method of claim 1 wherein step b) further comprises generating a light-scattering value simulating the effects of multiple light scattering between candidate yarn components in accordance with the yarn-angle value, and using that generated light-scattering value to compute the color coordinate values.

16. The method of claim 1 wherein the at least one factor governing the mixing of the candidate yarn components is selected from i) a factor representing the degree of mixing of the candidate yarn components, and ii) a factor representing the variation of mixing of the candidate yarn components as a function of distance along the yarn axis.

17. The method of claim 1 wherein the at least one factor governing the mixing of the candidate yarn components includes both i) a factor representing the degree of mixing of the candidate yarn components, and ii) a factor representing the variation of mixing of the candidate yarn components as a function of distance along the yarn axis.

18. The method of claim 1 wherein the at least one factor governing the rotational relationship of the candidate yarn components as a function of distance along the yarn axis is selected from i) a factor representing a degree of serial correlation and ii) a gain factor representing a rate of rotation of the candidate yarn components.

19. The method of claim 1 further comprising the step of simulating a fabric texture.

20. The method of claim 1 further comprising the step e) of repeating steps b) through d) to generate and display the simulated-color coordinate values for each of a plurality of adjacent picture elements thereby to define a yarn traverse across a fabric.

21. The method of claim 20 wherein the hypothetical fabric is a tufted carpet fabric and wherein each yarn traverse comprises a tuft row.

22. The method of claim 21 further comprising the steps of selecting a raft simulation method and a tuft type.

23. The method of claim 20 further comprising the step f) of repeating steps b) through e) to generate and display the simulated-color coordinate values for each of a plurality of yarn traverses across a hypothetical fabric thereby to define a hypothetical fabric pattern.

24. The method of claim 23 further comprising performing, after step c, the step c1) of storing the set of display device amplitude values, and wherein step d) is performed by outputting the stored display device amplitude values to the display.

25. The method of claim 24 further comprising the step of g) changing at least one heathering process parameter and repeating the steps b) through f) sequentially to store a second hypothetical fabric pattern, and thereafter outputting the first and second stored hypothetical fabric patterns to the display device simultaneously to enable comparison of visual effects of different heathering process parameters on the color pattern of hypothetical fabrics.

26. The method of claim 1 wherein the set of simulated-color coordinate values of step b) is computed by combining the colors of the candidate yarn components that contribute to the apparent color on a wavelength-by-wavelength basis.

27. The method of claim 1 wherein the computation of step b) further comprises using at least one look-up table yielding color-coordinates as a function of yarn angle in computing the set of simulated-color coordinate values.

28. Apparatus for predictively simulating and displaying on a display device a color pattern of a hypothetical fabric made of heather yarn comprised of multiple candidate yarn components, the heather yarn imparting appearance properties to the hypothetical fabric, said apparatus comprising:
   a) means for generating signals representative of each of a plurality of operator-selected heathering process parameters including at least:
      i) the number of candidate yarn components,
      ii) the color of each candidate yarn component,
      iii) at least one factor governing the mixing of the candidate yarn components, and
      iv) at least one factor governing the rotational relationship of the candidate yarn components as a function of distance along the yarn axis;
   b) means responsive to the rotational relationship factor for generating, for each predetermined picture element of the color pattern of the fabric, a yarn-angle value;
   c) means responsive to the yarn-angle value for computing a set of simulated-color coordinate values representative of a mixture of the colors of the candidate yarn components that contribute to the apparent color perceptible at that yarn angle;
   d) means for generating a set of display device amplitude values corresponding to the color coordinate values corresponding to the simulated color value for each predetermined picture element of the color pattern of the hypothetical fabric.

29. Apparatus of claim 28 wherein the color of each candidate yarn component is specified by color coordinates in a radiometrically non-linear color space, and wherein the means for computing a set of simulated-color coordinate values further comprises means for transforming the radiometrically non-linear color coordinates to a radiometrically linear color space, and such that the computation of the simulated-color coordinate values is performed in a radiometrically linear color space.

30. Apparatus of claim 28 wherein the means for generating a yarn-angle value includes means for generating a predetermined filter function applied to n adjacent yarn angles in a series of N yarn angles generated from N random numbers, where $1<n<N$.

31. Apparatus of claim 28 wherein the means for generating a yarn-angle value includes means for generating a predetermined filter function applied to n adjacent yarn angles in a series of N yarn angles generated from N random numbers, where $1<n<N$ where the random numbers specify incremental changes in yarn angle with distance along the yarn axis.

32. Apparatus of claim 31 wherein the a predetermined filter function is a moving average of n adjacent numbers in a series of N random numbers, where $1<n<N$.

33. Apparatus of claim 28 wherein the means for generating a yarn-angle value further comprises means for simulating the effects of multiple light scattering between candidate yarn components in accordance with the yarn-angle value, and means for using that generated light-scattering value to compute the color coordinate values.

34. Apparatus of claim 28 further comprising means for storing the generated display device amplitude value.

* * * * *